United States Patent [19]

Caracciolo, Jr. et al.

[11] Patent Number: 4,955,655
[45] Date of Patent: Sep. 11, 1990

[54] ROBOTIC END-OF-ARM TOOLING MULTIPLE WORKPIECE INTERNAL GRIPPER

[75] Inventors: Anthony Caracciolo, Jr., Troy; Wayne R. Austin, Warren; Dante C. Zuccaro, Allenton; Leonard P. Pomrehn, Mt. Clemens, all of Mich.

[73] Assignee: General Motors Corporation, Detroit, Mich.

[21] Appl. No.: 227,022

[22] Filed: Aug. 1, 1988

[51] Int. Cl.⁵ .......................... B25J 15/00; B66C 1/56
[52] U.S. Cl. ...................................... 294/93; 294/86.4; 901/41
[58] Field of Search ............ 294/93, 86.24, 86.25, 294/86.4, 98.1; 279/2 R, 2 A; 901/41, 29, 37

[56] References Cited

U.S. PATENT DOCUMENTS

| 1,524,265 | 1/1925 | Lester | 294/86.24 |
| 2,607,601 | 8/1952 | Drewes, Jr. et al. | 279/2 R |
| 2,777,701 | 1/1957 | Hohwart et al. | 279/2 A |
| 3,006,680 | 10/1961 | Gregory | 294/93 |
| 3,052,494 | 9/1962 | Williamson | 294/93 |
| 3,134,620 | 5/1964 | Blaisdell | 294/93 X |
| 3,829,147 | 8/1974 | Ryswick | 294/93 |
| 4,238,979 | 12/1980 | Jines | 279/2 R X |
| 4,253,694 | 3/1981 | Walter et al. | 294/98.1 |
| 4,332,066 | 6/1982 | Hailey et al. | 901/41 X |
| 4,770,456 | 9/1988 | Phillips et al. | 294/93 |

FOREIGN PATENT DOCUMENTS

| 3611806 | 10/1987 | Fed. Rep. of Germany | 901/29 |
| 709272 | 1/1980 | U.S.S.R. | 279/2 R |

Primary Examiner—Margaret A. Focarino
Assistant Examiner—Gary C. Hoge
Attorney, Agent, or Firm—Ernest E. Helms

[57] ABSTRACT

An apparatus and method of a robot or like end-of-arm tool (EOAT) for gripping workpieces by cavities in the workpieces is provided. The EOAT is connected with the robot or like and includes an extendible rod having a generally flanged end opposite the robot. The EOAT also includes at least one spacer encircling the rod between the robot or like and the flanged end of the rod, and at least two elastomeric gripper portions encircling the rod and capturing at least one spacer. The gripper portions have a first dimension when the rod is extended whereby at least one of the gripper portions can be inserted into a workpiece cavity and the gripper portions have a second dimension when the rod is retracted whereby the gripper portions can engage with the workpiece cavity to grip the workpiece.

2 Claims, 2 Drawing Sheets

ROBOTIC END-OF-ARM TOOLING MULTIPLE WORKPIECE INTERNAL GRIPPER

FIELD OF THE INVENTION

The field of the present invention is that of robot end-of-arm tooling devices (EOAT) commonly referred to as end effectors. More particularly the field of the present invention relates to EOATs for gripping a plurality of workpieces by the cavities or interior bores of the workpieces.

DISCLOSURE STATEMENT

It is well known to provide robots or like with EOAT internal grippers which allow the robot to manipulate the workpiece by gripping the workpiece by an internal bore or cavity. There are two major types of EOAT internal grippers. One type of EOAT internal gripper provides an actuator connected by a linkage with a series of fingers which can be moved outward. One problem of the linkage type EOAT internal gripper is that it is often hard to provide a linkage giving the desired dimensional compliance.

Another type of EOAT internal gripper is the inflatable bladder gripper. The inflatable bladder gripper has a bladder (with or without a surrounding shell) which may be inserted within the cavity of the part. A hydraulic or pneumatic system is provided for inflating the bladder causing the bladder (or surrounding shell) to engage with the workpiece cavity to grip the workpiece. Although the inflatable bladder gripper usually provides more dimensional compliance than the typical linkage EOAT internal gripper, often the dimensional compliance provided is still not sufficient for a given application. Also the inflatable bladder gripper often requires the use of very high air or hydraulic pressure to provide the proper compliance. Further, the use of air or hydraulic pressure in the bladder can provide sealing problems. Still another disadvantage of inflatable bladder grippers, especially pneumatic ones, is that failures can be sudden, causing unplanned downtime to change the bladder. With an inflatable bladder gripper care must be taken to protect the bladder from burrs and/or sharp edges which can readily damage the bladder leading to failure of the bladder.

An alternative to the above-described EOAT is described in Phillips et al "Robotic End-Of-Arm Internal Gripper" U.S. Pat. 4,770,456 commonly assigned. The Phillips et al EOAT is ideally suited for gripping a single, relatively thin-walled cylinder. The Phillips et al EOAT is especially useful when handling cylinders which are open at both ends.

SUMMARY OF THE INVENTION

The present invention provides a gripper more suited for use with heavier thick-walled cylinders. Furthermore, the present invention provides an EOAT internal gripper for a plurality of workpieces and in a preferred embodiment can accommodate workpieces of widely divergent internal diameters. Also, the present invention does not require the EOAT to make axial contact with a surface to activate a gripping function.

It is an object of the present invention to provide an apparatus and method of utilization of the same of a multiple workpiece EOAT internal gripper.

It is another object of the present invention to provide a robot or like end-of-arm tool (EOAT) for gripping workpieces by cavities in the workpieces, the EOAT including means for connecting the EOAT with the robot or like, rod means having a generally flanged end opposite the robot being extendible with respect to the connecting means, at least one spacer encircling the rod means between the connecting means and the flanged end of the rod, and at least two elastomeric gripper portions encircling the rod and capturing at least one spacer, the gripper portions having a first dimension when the rod means is extended whereby the gripper portions can be inserted into one of the workpieces' cavities and the gripper portions having a second dimension when the rod means is retracted whereby the gripper portions can engage with one of the workpieces' cavity to grip the workpieces.

It is another object of the present invention to provide a robot or like EOAT for gripping a first workpiece by a first cavity in the first workpiece, and a second workpiece by a second cavity in the second workpiece, the second cavity being substantially smaller than the first cavity, the EOAT including means for connecting the EOAT with the robot or like, the connecting means including axial posts connected with the robot or like having a flanged end opposite the robot or like, a cylinder with holes aligned with the axial posts, mounted on the axial posts, the cylinder having a central bore on an end of the cylinder opposite the robot or like, first spring means biasing the cylinder away from the robot or like, a plate slidably mounted within the cylinder with at least three geometrically spaced radial passages with a slidably mounted plunger mounted therein, second spring means biasing the plungers outward against the cylinder centering the plate within the cylinder, and a stud connected with the plate projecting through the cylinder central bore, a fluid actuated cylinder connected with the stud, a rod extendible for the fluid actuated cylinder, the rod having a flanged end, a tapered spacer encircling the rod between the fluid actuated cylinder and the flanged end of the rod having a larger diameter on an end of the spacer toward the fluid actuator cylinder, and first and second gripper portions encircling the rod capturing the spacer, the first and the second gripper portions having an elastomeric annular shaped section press-fitted upon a disk, the disk having a bore with a diameter closely adjacent to the rod and said first gripper portion having a larger diameter and being more adjacent to the fluid actuated cylinder than the second gripper portion and whereby the spacer tapers from an outer diameter of the first gripper portion to a dimension smaller than the inner diameter of the secondary gripper portion elastomeric section whereby the first and second gripper portions have a first dimension when the rod means is extended wherein the gripper portions can be inserted into a respective workpiece cavity and the gripper portions having a second dimension when the rod means is retracted wherein the gripper portions can engage with the respective workpiece cavity to grip the respective workpiece.

It is another object of the present invention to provide a method of gripping a plurality of workpieces by a cavity in each of the workpieces using a robot or like, the method including connecting an actuator with an extendible rod with the robot or like wherein the rod has a flanged end opposite the robot or like, encircling the rod with at least one spacer between the flanged end of the rod and the actuator, encircling the rod and capturing at least one spacer with a plurality of gripper portions, extending the rod whereby the gripper portions have a first dimension allowing the gripper portions to be inserted into a cavity of a respective workpiece, and retracting the rod whereby the gripper portions have a second dimension engaging with the respective workpiece cavity to grip the respective workpiece.

Other objects and advantages of the present invention will become more apparent to those skilled in the art as the nature of the invention is better understood from the accompanying drawings and a detailed description.

DETAILED DESCRIPTION OF THE DRAWINGS

Figure 1:
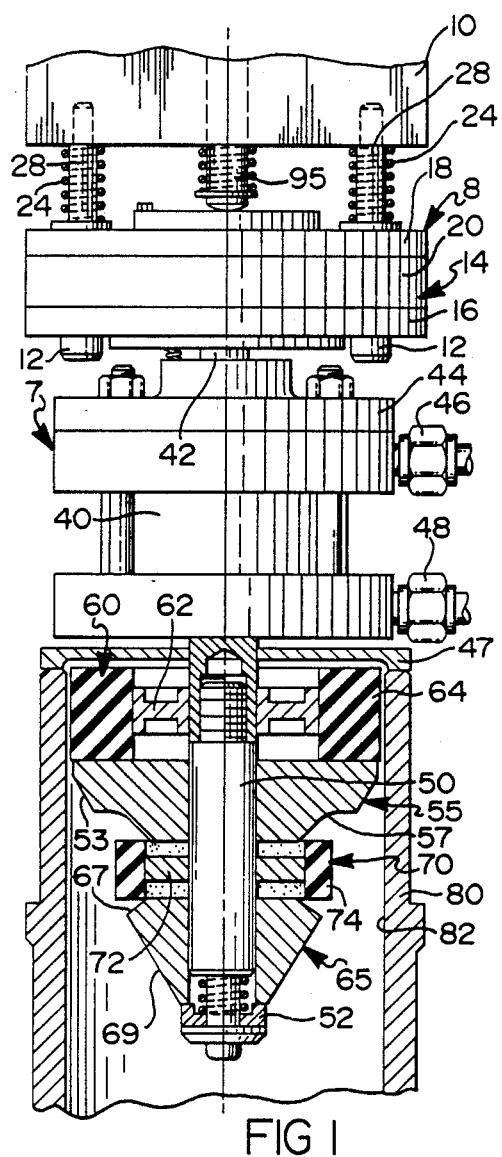
FIG. 1 is a sectional view with portions shown in side elevation of a robot or like with preferred embodiment EOAT of the present invention.

Referring to FIGS. 1, 2, 3, and 4, the EOAT 7 of the present invention is connected with a robot or like 10. A compliance device 8 provides the means of connection of the EOAT to the robot 10.

The compliance device has a series of axial posts or bolts 28 connected with the robot 10. The bolts 28 have a flanged end or head 12 opposite the robot 10. Each bolt 28 is encircled by a first spring means 24.

Slidably mounted on the bolts 28 via aligning holes is a cylinder 14. Cylinder 14 has two end plates 16, 18 and a side wall 20. On an end opposite the robot 10, cylinder 14 has a central bore 22.

Slidably mounted within cylinder 14 is a plate 30. Plate 30 has at least three (3) and as shown six (6) geometrically spaced radial passages 32. Each radial passage 32 has a slidably mounted plunger 34 biased outward by a second spring means 36. Second spring 36 and the plunger 34 center the plate 30 within the cylinder 14. Polymeric bearing plugs 38 provide for smooth movement of the plate 30 within the cylinder 14. To join the plate 30 with the remainder of the EOAT there is a stud 42.

The compliance device 8 allows the EOAT to have compliance in four axes. The first axis is parallel with the bolts 28. The second and third axes are along the plane of movement of plate 30. The fourth axis of movement is a slight pivotal movement due to the clearance of the holes in cylinder 14 with the bolts 28.

A reversible fluid (pneumatic) actuated piston cylinder 40 is provided to power a rod means 50. The rod has a flanged end 52 opposite the robot 10. To extend the rod 50 air is admitted into an inlet 46. To retract the rod 50 air is admitted into an inlet 48. Cylinder 40 is connected to the compliance device 8 by a plate 44 which captures a stud 42.

Encircling the rod 50 between the cylinder 40 and the flanged end 52 is at least one spacer 55. Second spacer 65 is located on rod 50 towards the flange 52. The first tapered spacer 55 is more adjacent to the cylinder 40.

Encircling the rod 50 and capturing the first spacer 55 are the first 60 and second 70 elastomeric gripper portions. The first gripper portion 60 is more adjacent to the cylinder 40 and typically will have an outside diameter greater than the outside diameter of the second gripper portion 70. Both the first 60 and second 70 gripper portions have an elastomeric section 64, 74 which is annular in shape. To help provide for proper alignment, the elastomeric sections 64, 74 of the gripper portions 60, 70 are press-fitted over respective disks 62 and 72. The disks 62 and 72 have a bore which is closely adjacent to the diameter of rod 50.

Figure 2:
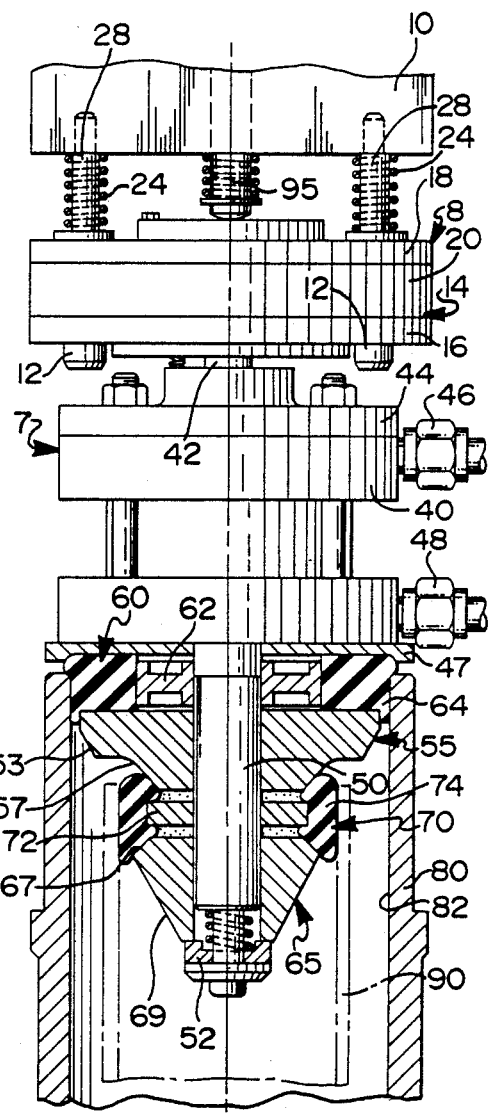
FIG. 2 is a sectional view similar to FIG. 1 with the rod in a retracted position.
Figure 3:
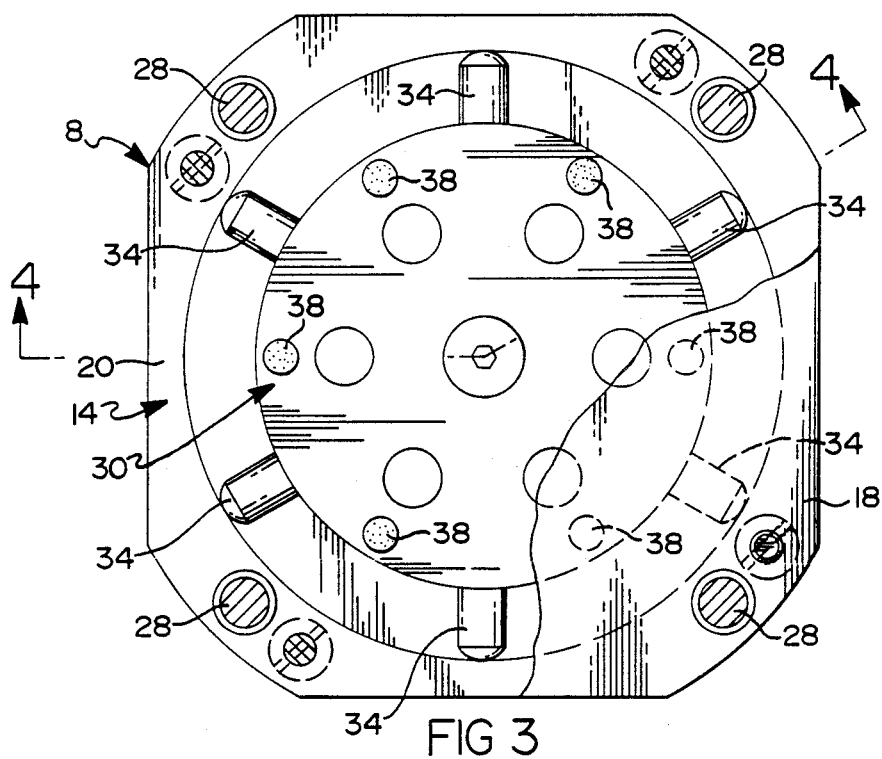
FIG. 3 is a top sectional view with portions cut away of the EOAT of FIG. 1.
Figure 4:
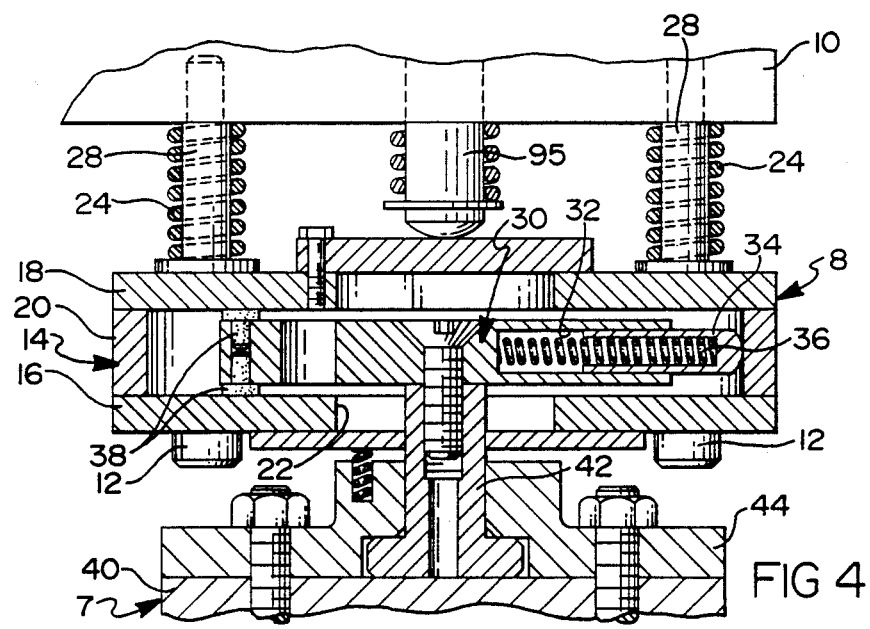
FIG. 4 is a sectional view of the compliance portion of the EOAT shown in FIG. 1 taken along line 4—4 of FIG. 3.

In operation, the first gripper portion 60 has a normal first outside dimension (FIG. 1). In the first dimension first gripper 60 elastomeric section 64 will allow EOAT 7 to be inserted into the open cylinder workpiece 80 inner cavity or bore 82. Retraction of the rod 50 causes the first gripper portion elastomeric section 64 to be placed in compression whereby it elastically deforms into a second enlarged diameter (FIG. 2). The second gripper portion 70 acts in a similar fashion.

The first spacer 55 is tapered from the outside diameter of the first gripper portion 60 to a diameter slightly smaller than the inside diameter of the second gripper portion 70 elastomeric section 74. In a similar manner, the second spacer 65 has a tapered surface 67 which is smaller than the inside diameter of the second gripper portion elastomeric. The tapered surfaces 57 and 67 increases the outer diameter of the second gripper portion 70 elastomeric section when the rod 50 contracts.

The disks 62 and 72 are added to eliminate mass from the gripper portions 60, 70 while still allowing proper alignment of the gripper portions 60, 70 with respect to the rod 50. The mass reduction not only decreases the weight of the EOAT 7 but also allows the use of a smaller actuator cylinder since less elastomeric material is compressed.

When coming down to pick up cylinder 80 (or 90 phantom FIG. 2), a tapered alignment surface 53 (or 69) of the spacer 55 (or 65) will guide the EOAT 7 into the proper orientation as the EOAT 7 penetrates the required distance to pick up the cylinder. The EOAT 7 can be utilized to pick up two cylinders (80 and 90) at one time or can be utilized separately.

When proceeding down to pick up the cylinder, the EOAT 7 does not have to make axial contact with any reference point to actuate the gripper portions 60 and 70. The actuation of the gripper portions 60 and 70 can be programmed to be totally independent of any contact with the cylindrical workpieces. Therefore, the EOAT 7 can be used with cylinders that are open at both ends.

The EOAT 7 is readily usable to pick up heavier workpieces and provides a retention force which is very high compared with many prior internal grippers. Plate 47 axially floats on the rod 50. Plate 47 makes contact with the top of the cylindrical workpiece 80. Therefore, if the workpieces is improperly located in relation to the programmed movement of the robot 10, further downward movement of robot 10 will cause cylinder 14 (via plate 47) to be pushed against a spring loaded cut off switch 95 and the robot 10 will be shut off. Alternatively, if desired, the push on the switch 95 can be used to signal the robot 10 to activate the cylinder 40.

The present invention provides a method of using a robot to grip a plurality of workpieces by a cavity in each workpiece, the method including the following steps:

1. Connecting an actuator 40 with an extendible rod 50 with the robot or like 10 wherein the rod 50 has a flanged end 52 opposite the robot or like 10;

2. Encircling the rod 50 with at least one spacer 55 between the flanged end 52 of the rod 50 and the actuator 40;

3. Encircling the rod 50 and capturing at least one spacer 55 with a plurality of gripper portions 60, 70;

4. Extending the rod 50 whereby the gripper portions 60, 70 have a first dimension allowing the gripper portions 60, 70 to be inserted into the cavity of respective workpieces 80, 90; and 5. Retracting the rod 50 whereby the gripper portions 60, 70 have a second dimension engaging with the respective workpiece cavity to grip the respective workpieces 80, 90.

While an embodiment of the present invention has been explained, it will be readily apparent to those skilled in the art of the various modifications which can be made to the present invention without departing from the spirit and scope of this invention as it is encompassed by the following claims.

The embodiments of the invention in which an exclusive property or privilege is claimed are defined as follows:

1. A robot or like EOAT for gripping a first workpiece by a first cavity in said first workpiece, and a second workpiece by a second cavity in said second workpiece said second cavity being substantially smaller than said first cavity, said EOAT in combination comprising:

means for connecting said EOAT with said robot or like, said connecting means including:

axial posts connected with said robot or like having a flanged end opposite said robot or like;

a cylinder with holes aligned with said axial posts mounted on said axial posts, said cylinder having a central bore on an end of said cylinder opposite said robot or like;

first spring means biasing said cylinder away from said robot or like;

a plate slidably mounted within said cylinder with at least three geometrically spaced radial passages with a slidably mounted plunger mounted therein;

second spring means biasing said plungers outward against said cylinder centering said plate within said cylinder;

a stud connected with said plate projecting through said cylinder central bore;

a fluid actuated cylinder connected with said stud; and a rod extendible by said fluid actuated cylinder, said rod having a flanged end;

a tapered spacer encircling said rod between said fluid actuated cylinder and said flanged end of said rod having a larger diameter on an end of said spacer toward said fluid actuator cylinder; and first and second gripper portions encircling said rod capturing said spacer, said first and second gripper portions each having an elastomeric annular-shaped section press-fitted upon a disk, said disk having a bore with a diameter closely adjacent to said rod and said first gripper portion having a larger diameter and being more adjacent to said fluid actuated cylinder than said second gripper portion and whereby said spacer tapers from an outer diameter of said first gripper portion to a dimension smaller than said inner diameter of said second gripper portion elastomeric section, whereby said first and second gripper portions have a first dimension when said rod means is extended wherein said gripper portions can be inserted into a respective workpiece cavity and said gripper portions having a second dimension when said rod means is retracted wherein said gripper portions can engage with said respective workpiece cavity to grip said respective workpiece.

2. A robot or like end-of-arm tool (EAOT) for gripping workpieces by cavities in said workpieces, said EOAT in combination comprising:

means for connecting said EOAT with said robot or like;

rod means having a generally flanged end opposite said robot being extendible with respect to said connecting means;

at least one spacer encircling said rod means between said connecting means and said flanged end of said rod; and at least two elastomeric gripper portions encircling said rod means and capturing at least one spacer, said gripper portions having a first dimension when said rod means is extended whereby said gripper portions can be inserted into one of said workpieces' cavities and said gripper portions having a second dimension when said rod means is retracted whereby said gripper portions can engage with one of said workpieces' cavity to grip said workpiece and a section of one of said gripper portions facing said spacer is annular shaped and said spacer has a tapered end with a diameter smaller than an inside diameter of said gripper section.

* * * * *